United States Patent [19]

Nioras

[11] 4,340,610

[45] Jul. 20, 1982

[54] FLEXIBLE POUCH AND THERMOCOUPLE LOCATOR THEREFOR

[75] Inventor: Robert L. Nioras, Port Chester, N.Y.

[73] Assignee: RJR Foods, Inc., San Francisco, Calif.

[21] Appl. No.: 181,587

[22] Filed: Aug. 27, 1980

[51] Int. Cl.³ .................. G01K 7/02; B65B 29/08; B65B 25/22

[52] U.S. Cl. .................................... 426/88; 99/342; 426/87; 426/232; 426/383; 426/412; 422/119; 374/150

[58] Field of Search ................ 426/232, 88, 412, 87, 426/383; 99/342; 73/343 R, 343 B, 352, 374, 375; 248/95; 422/119

[56] References Cited

U.S. PATENT DOCUMENTS

| | | | |
|---|---|---|---|
| 1,086,002 | 2/1914 | Stewart | 248/95 |
| 1,430,937 | 10/1922 | Bundrick | 73/374 |
| 1,670,507 | 5/1928 | Jose | 73/374 |
| 2,067,016 | 1/1937 | Packer | 73/378 |
| 3,132,029 | 5/1964 | Beck | 426/412 |
| 3,754,465 | 8/1973 | Romito et al. | 426/88 |
| 3,769,028 | 10/1973 | Katz et al. | 426/232 |
| 3,769,932 | 11/1973 | Romito et al. | 99/342 |
| 3,812,716 | 5/1974 | McIntyre | 99/342 |
| 3,866,472 | 2/1975 | Witt | 99/342 |
| 3,900,635 | 8/1975 | Funderbunk et al. | 426/412 |
| 3,950,632 | 4/1976 | Rivelli | 99/342 |
| 3,964,313 | 6/1976 | Connick | 73/352 |

OTHER PUBLICATIONS

Package Engineering, vol. 5, #7, 7/60, (Wornick et al.).
Ford Engineering, 1/56.
Dept. of H.E.W. & FDA, "The Sterilization of Food in Pouches-Critical Parameters for still Processing", Berry, 1979.

Primary Examiner—Steven L. Weinstein
Attorney, Agent, or Firm—Grover M. Myers; Manford R. Haxton

[57] ABSTRACT

A thermocouple locator for holding a thermocouple inside a flexible pouch comprises a rigid frame that bears snugly against the pouch to prevent relative movement of the frame and pouch. The frame includes attachment means for securing a thermocouple to the frame.

2 Claims, 11 Drawing Figures

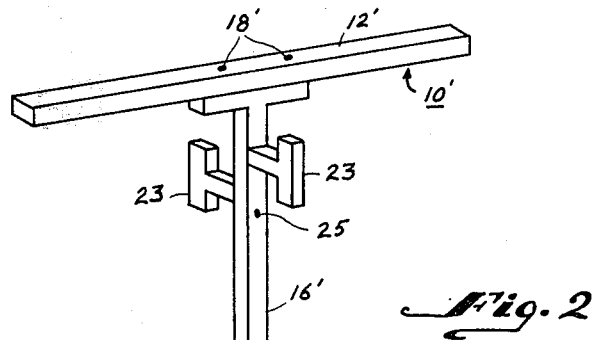
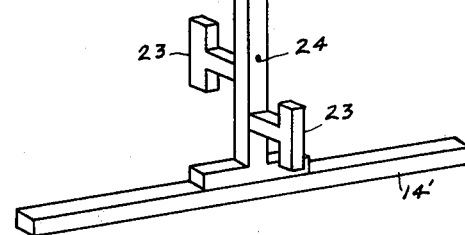
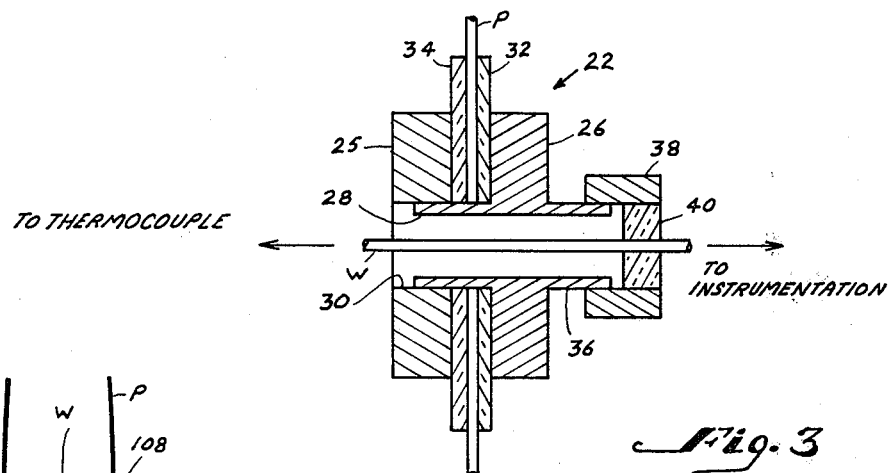
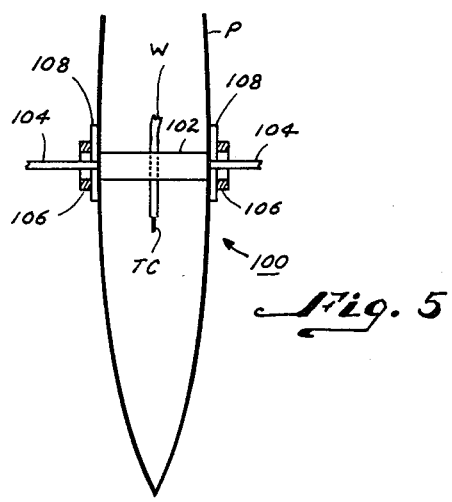

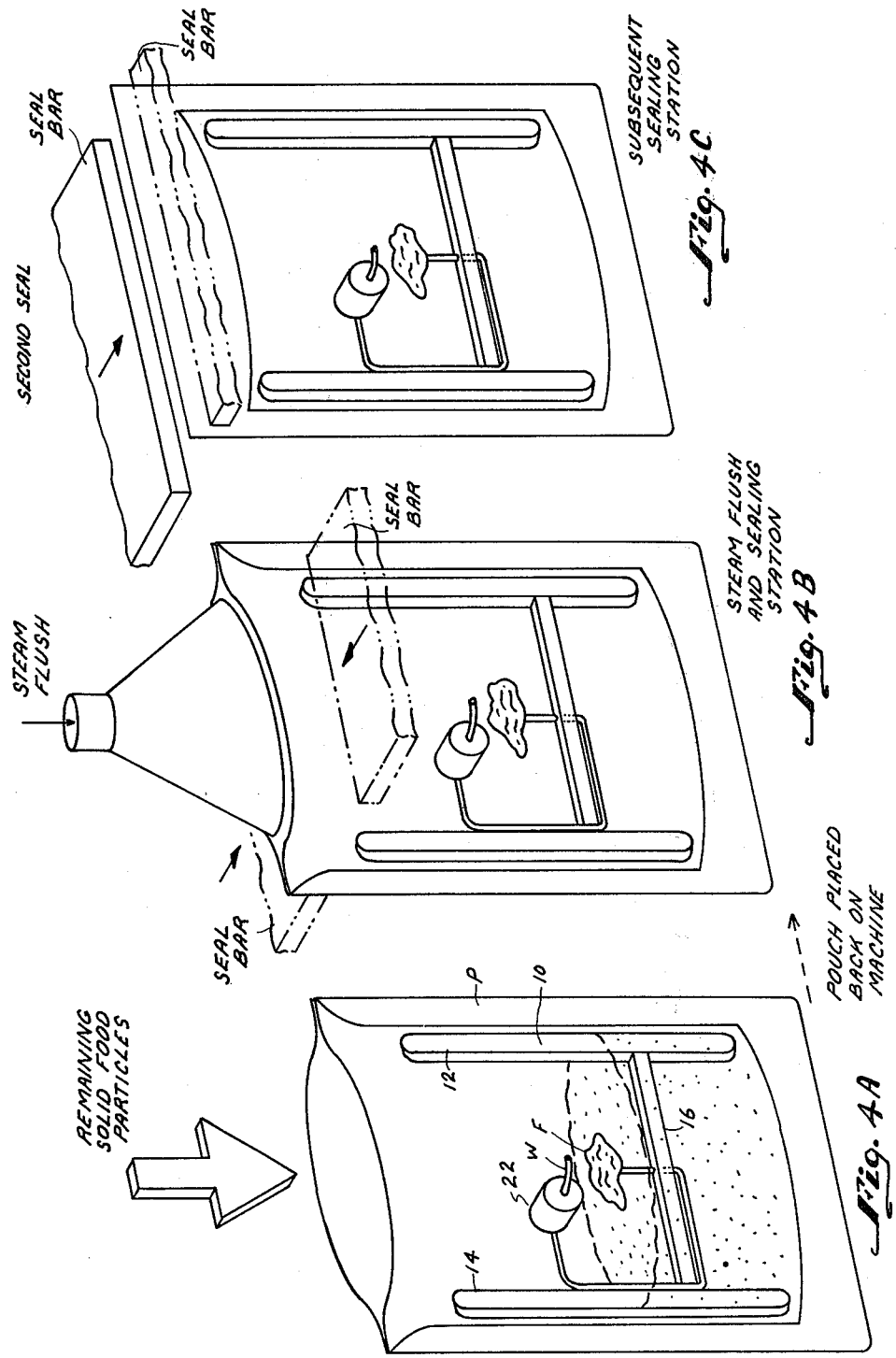

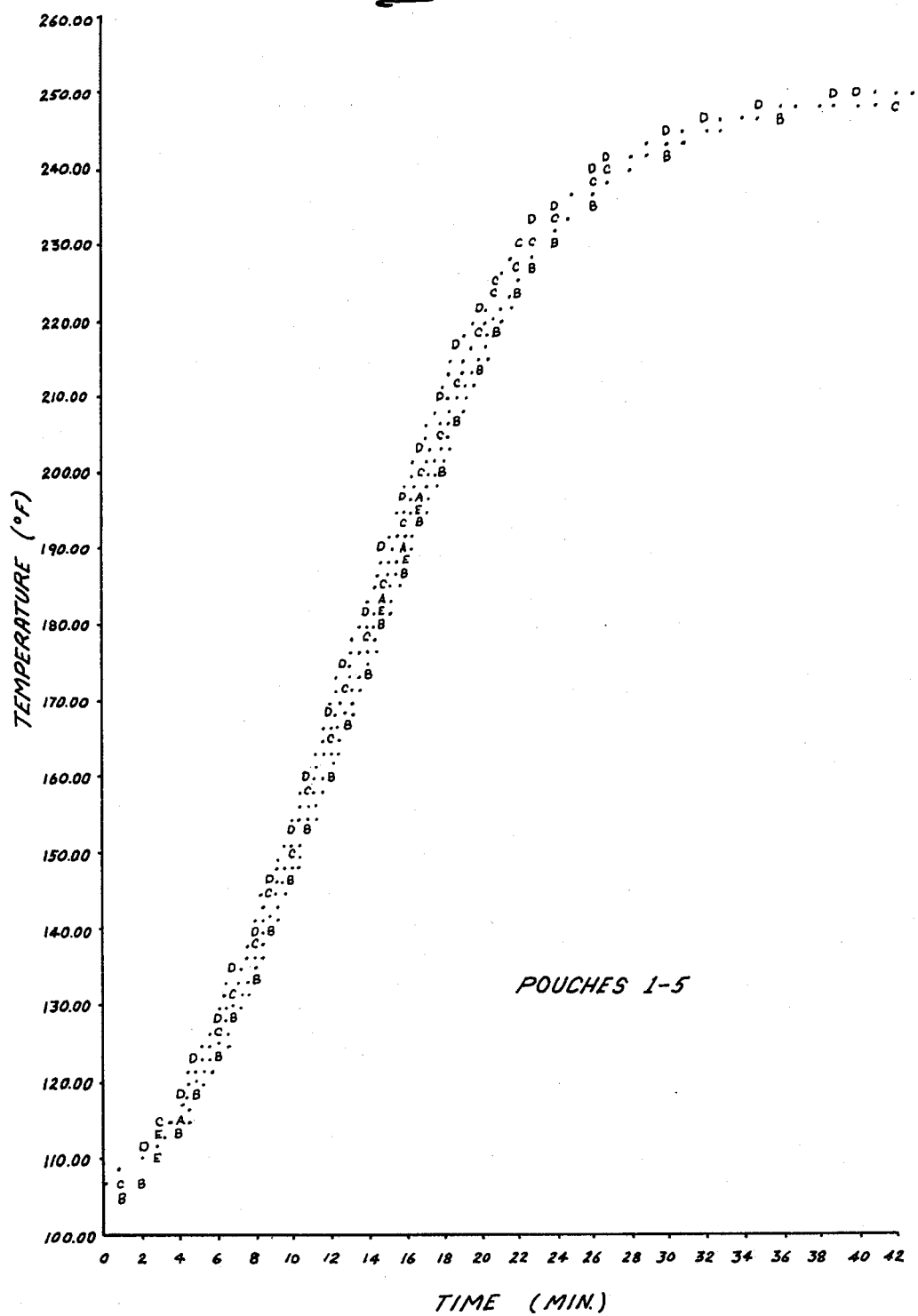

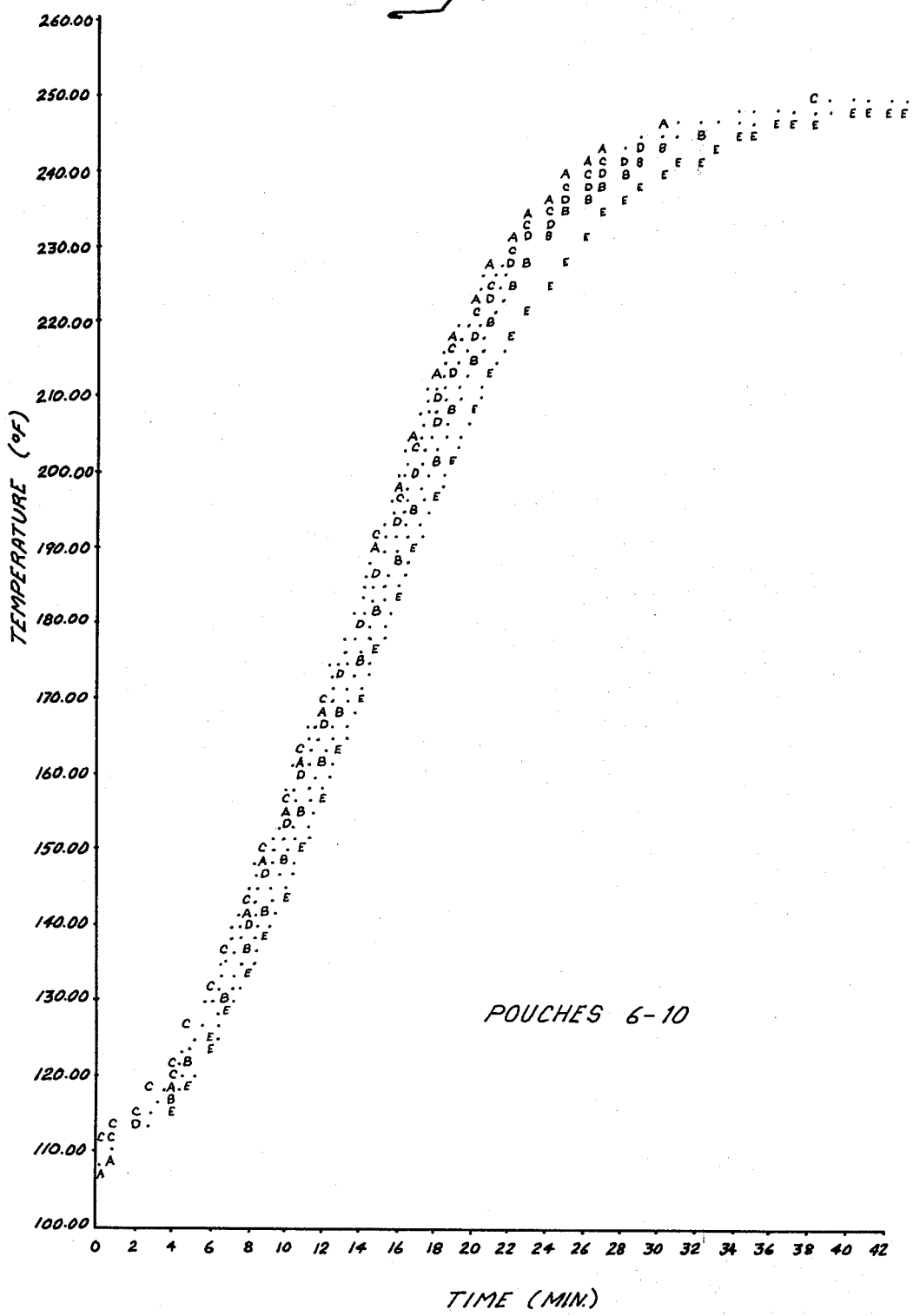

FLEXIBLE POUCH AND THERMOCOUPLE LOCATOR THEREFOR

BACKGROUND OF THE INVENTION

1. Field of the Invention

The present invention relates to flexible pouch packaging, and more particularly to apparatus for testing heat penetration into a flexible pouch package.

2. Description of the Prior Art

Sterilization of food to prevent bacterial growth and provide long shelf-life is a well-known practice in the canning industry. The sterilization takes place by thermally processing the packaged food at elevated temperatures for a predetermined time.

When packaging a particular food product for the first time, or when using a new package, such as a different size can, tests must be run to establish process specifications that will insure that all of the food in the package is sterilized. Recognized testing techniques require that the bacteria count be established after the container is exposed to different temperatures for different times. Accurate correlation of bacteria count with the time-temperature conditions actually experienced by the food requires measurement of the temperature inside the container.

The location within the container where the temperature is measured is also important because all of the food must be sterilized.

The measurement therefore should take place at that spot in the package that is the slowest to heat; for regularly shaped packages, the geometric center. If there is uncertainty over whether the measurement was taken there, there will be uncertainty over whether the processing actually sterilized all of the food. In that case, process specifications, to be safe, will have to call for thermal processing exceeding what the tests have indicated is necessary. Excessive thermal processing affects the product taste and is avoided whenever possible.

The same criteria for thermal processing and sterilization apply to flexible pouches as apply to the more familiar can or jar, except excessive thermal processing is especially to be avoided with flexible pouch packages. One of the benefits of a flexible pouch over more traditional packages is that its thin shape allows less cooking of the pouch to sterilize all of its contents than a can or a jar requires. That is so because the contents near the package walls do not get overcooked nearly to the degree that occurs in cans and jars just to cook adequately the food at the package center. However, that benefit cannot be fully realized unless a thermocouple can be held at a specific location inside the pouch, generally its geometric center. Without that capability, excessive thermal processing will have to be specified to be sure that all of the food in the pouch is adequately sterilized.

With a rigid container such as a can, the problems of holding a thermocouple at a desired location is not particularly severe. The can walls can not be moved to displace the product within the can. Because the can walls are rigid, a probe with a thermocouple at the end can be secured to the can walls to hold the thermocouple in place.

Wire holders have been used to position an indicator card, made of a time temperature-sensitive material, within a can during processing, as shown in U.S. Pat. No. 3,754,465 to Romito, et al. But that patent does not teach how to hold a thermocouple inside a flexible pouch package, but instead relies on the rigidity of the container to position a large, flat indicator card.

Maurice R. Berry, Jr., Ph.D., in "The Sterilization of Food and Pouches—Critical Parameters for Still Processing", a presentation for the symposium "Using the Retort Pouch—Worldwide", sponsored by the Food Science Institute at Purdue University on Mar. 14–15, 1979, at Indianapolis, Ind., discloses two devices used in an attempt to hold a thermocouple at the center of a flexible pouch. One of the devices was a coiled wire, with the helix diameter equal to the pouch thickness, secured to the pouch walls. The second device was an accordion-pleated web of material sealed to and spanning the pouch walls. The thermocouple was supported through a hole in the center of the web. Dr. Berry used the second device to take temperature measurements. However, both of those devices are somewhat cumbersome solutions to the problem because securing the device to the pouch walls requires manipulation of the device in the limited space inside the pouch.

SUMMARY OF THE INVENTION

The present invention improves over the prior art by providing a rigid frame that will fit snugly into a flexible pouch and bear against the pouch walls to positively locate the frame and prevent movement of it relative to the pouch. The rigid frame includes attachment means for securing a thermocouple to the frme to hold the thermocouple at the desired location within the pouch.

BRIEF DESCRIPTION OF THE DRAWINGS

FIG. 2 shows a second embodiment of a thermocouple locator according to the present invention.

FIG. 3 shows a packing gland that enables a lead wire from a thermocouple inside a flexible pouch to be passed through the pouch wall.

FIGS. 4A, 4B, 4C depict schematically a method for filling a flexible pouch, in preparation for heat penetration tests.

FIG. 5 shows a control thermocouple locator used to test the accuracy of a thermocouple locator according to the present invention.

FIGS. 7A and 7B plot the temperatures measured by thermocouples held in ten different flexible pouches by thermocouple locators according to the present invention.

DETAILED DESCRIPTION OF THE PREFERRED EMBODIMENTS

Figure 1:
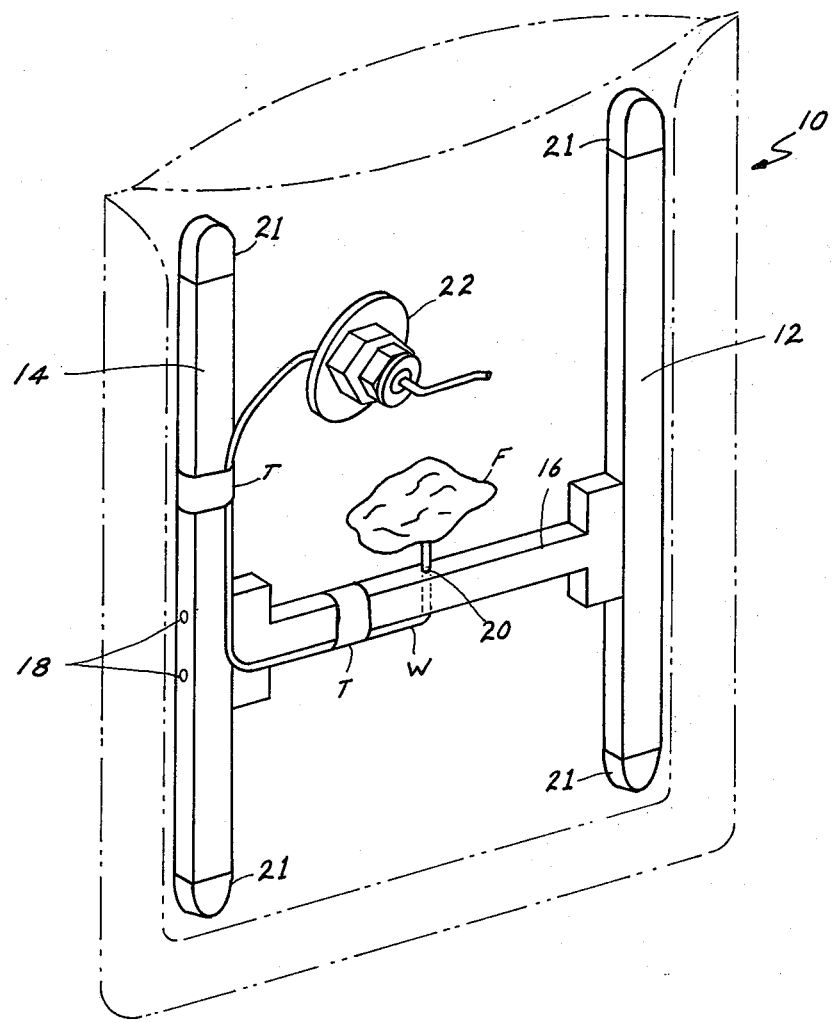
FIG. 1 depicts a thermocouple locator according the present invention in place in a flexible pouch with a thermocouple secured to the frame.

FIG. 1 shows a thermocouple locator in position in a flexible pouch package prior to the top seal of the package having been made. An H-shaped rigid frame 10 has two parallel uprights 12 and 14 joined by a cross-bar 16 perpendicular to the uprights 12 and 14. The cross-bar 16 is offset slightly from a point equidistant from the ends of the uprights and is connected to the uprights by small brads 18. The thermocouple locator 10 is preferably made of a rigid, non-heat-conducting material. A small hole 20 is drilled through the cross-bar 16.

FIG. 1 shows a solid food particle F impaled on a thermocoupled (not shown) and located at the geometric center of the pouch by the thermocouple locator 10. A thermocouple lead wire W is passed through the hole 20 and the thermocouple at the end of the wire W is embedded within the food particle F. The thermocouple lead wire W passes through the pouch wall at a packing gland 22 and is attached at its other end to appropriate instrumentation. The thermocouple wire W is secured to the frame, most conveniently by tape T, in normal operation. The length of the uprights 12 and 14 bear against the side seams of the pouch, and the ends of the uprights 12 and 14 bear against the bottom seam and, after it is made, the top seam of the pouch. The ends 21 of uprights 12 and 14 are tapered so the pouch is not punctured when the thermocouple locator 10 is in place. Because the cross-bar 16 is made just long enough to cause the uprights to bear snugly against the length of the side seams of the pouch, and the uprights are just long enough so that their ends bear snugly against the closed top and bottom seams of the pouch, the frame cannot move inside the pouch after the pouch is sealed closed. The cross-bar 16 is offset slightly from the center of the upright to enable the thermocouple to be located away from the cross-bar, but still at the geometric center of the pouch, thus allowing heat to penetrate to the thermocouple unimpeded by the cross-bar.

FIG. 2 shows a second embodiment of the thermocouple locator of the present invention. An H-shaped frame 10' has two uprights 12' and 14' connected by a cross-bar 16', in the same fashion as frame 10. The thermocouple locator of this embodiment includes spacer members 23 connected to the cross-bar 16' by small brads 24. The spacer members 23 are normal to the plane of the frame. The spacers 23 prevent the pouch from collapsing at the location of the solid food particle F and thereby further insure accuracy of the heat penetration data. FIG. 2 also indicates how a thermocouple locator according to the present invention can be inserted into a pouch with the uprights bearing against the top and bottom seams.

FIG. 3 shows the packaging gland 22 in detail. The packing gland 22 comprises an inside nut 25 and an outside nut 26, both made of a rigid non-heat conducting material. The outside nut 26 has an externally threaded extension 28 that cooperates with internal threads on a hole 30 through the inside nut 25 to secure the nuts 25 and 26 together. The extension 28 in the outside nut 26 extends through holes in two soft, resilient washers 32 and 34, which have the pouch wall between them. The nuts 25 and 26 seal the pouch wall between the washers 32 and 34 when the nuts are screwed together. The nut 26 also includes an outwardly extending, externally threaded portion 36 that cooperates with an internal thread on a sealing nut 38 made of a rigid, non-heat conducting material. The sealing nut 38 includes an elastomeric packing 40 that closes the bore through the sealing nut 38. The thermocouple wire W extends through the internal bores of nuts 22 and 24 and passes through an interference hole in the elastomeric packing 40, which seals the thermocouple wire W to prevent leakage across the pouch walls.

FIG. 4 illustrates how the thermocouple locator of the present invention permits accurate and reliable testing of the penetration of heat into a solid food particle in a flexible pouch during thermal processing.

A flexible pouch P, which has two side seams a bottom seam, and an open top, has a thermocouple lead wire W extending through one of the pouch walls, sealed thereto with a packing gland 22 like that shown in FIG. 3.

The flexible pouch P is made from a laminated material, the inner laminate of which is fusible with the application of heat. Typically such pouches are made on conventional machinery known as form, fill and seal machines. One type of form, fill and seal machine makes a series of pockets by longitudinally folding and then by transversely sealing a continuous roll of material. The pockets are then cut at the transverse seams connecting them to form individual pouches. The pouches are then conveyed under one or more filling stations and then steam flushed to reduce the air content in the pouch and the open top is heat sealed to form the completed pouch.

FIG. 4A shows a pouch that has been formed, removed from the machine, and adapted for heat penetration testing. The end of the thermocouple lead wire W inside the pouch P extends through the hole 20 in the cross-bar 16 of the rigid frame thermocouple locator 10. The thermocouple extends beyond the cross-bar 16 a sufficient distance to place it at the geometric center of the pouch when the frame 10 is in place in the pouch.

Before the frame 10 is placed in the pouch, the thermocouple lead wire W is taped to the cross-bar 16 and the upright 14 as shown in FIG. 1. The lead wire W is threaded through the packing gland 22. If, as is depicted in FIG. 4A, the food consists of a liquid or semi-liquid sauce and particulate food (for example, chicken a la king or beef stroganoff), the sauce is first placed in the pouch. The sauce will typically reach a level just about where the cross-bar will be located when the frame is placed in the pouch. The largest piece of solid food in the batch to be packaged is selected and is impaled on the thermocouple and the frame is placed in the pouch as is shown in FIG. 4A. The remaining solid food particles are then placed in the pouch. Impaling the largest solid particle on the thermocouple insures that the test results will indicate heat penetration to the slowest heating part of the package. The pouch is filled in this manner, that is, first sauce and then the food particles, because that is how it would be filled on the form, fill and seal machine in production and the object of the heat penetration tests is to determine the effectiveness of the thermal processing under production conditions.

The filled pouch is then placed back on the form, fill and seal machine at the point where it was removed, that is, just after being severed into an individual pouch and before going under the filling stations. It is reinserted on the machine there because it is convenient. The normal filling stations, through which the pouch will then pass, are made inoperative when pouches for heat penetration testing are being assembled in this manner.

The machine conveys the pouch past the inoperative filling stations and into the steaming station, shown in FIG. 4B. The H-shaped frame is particularly advantageous here because it does not interfere with the steam flush, thus maintaining the test filling procedure identical to production conditions. As is conventional in flexible pouch packaging, a steam hood flushes the open top of the pouch as heat sealing bars press and fuse the pouch walls together to form a seal. Typically, the seal is finished in one or more stations, depicted in FIG. 4C, following the steam station of FIG. 4B.

Figure 6A:
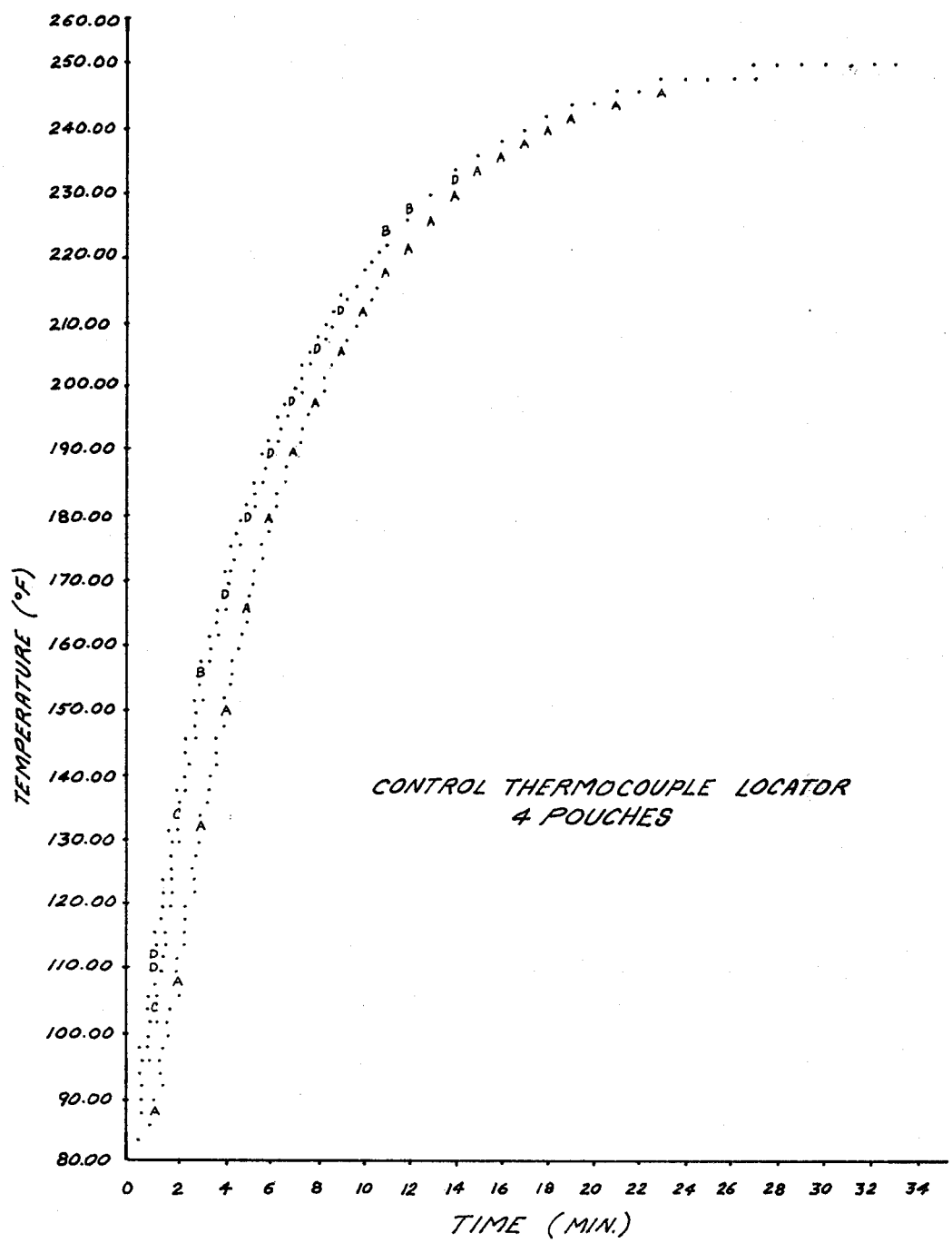
FIGS. 6A and 6B plot the results of heat penetration tests conducted comparing the temperatures measured by thermocouples held inside flexible pouches by thermocouple locators according to the present invention and control thermocouple locators as shown in FIG. 5.
Figure 6B:
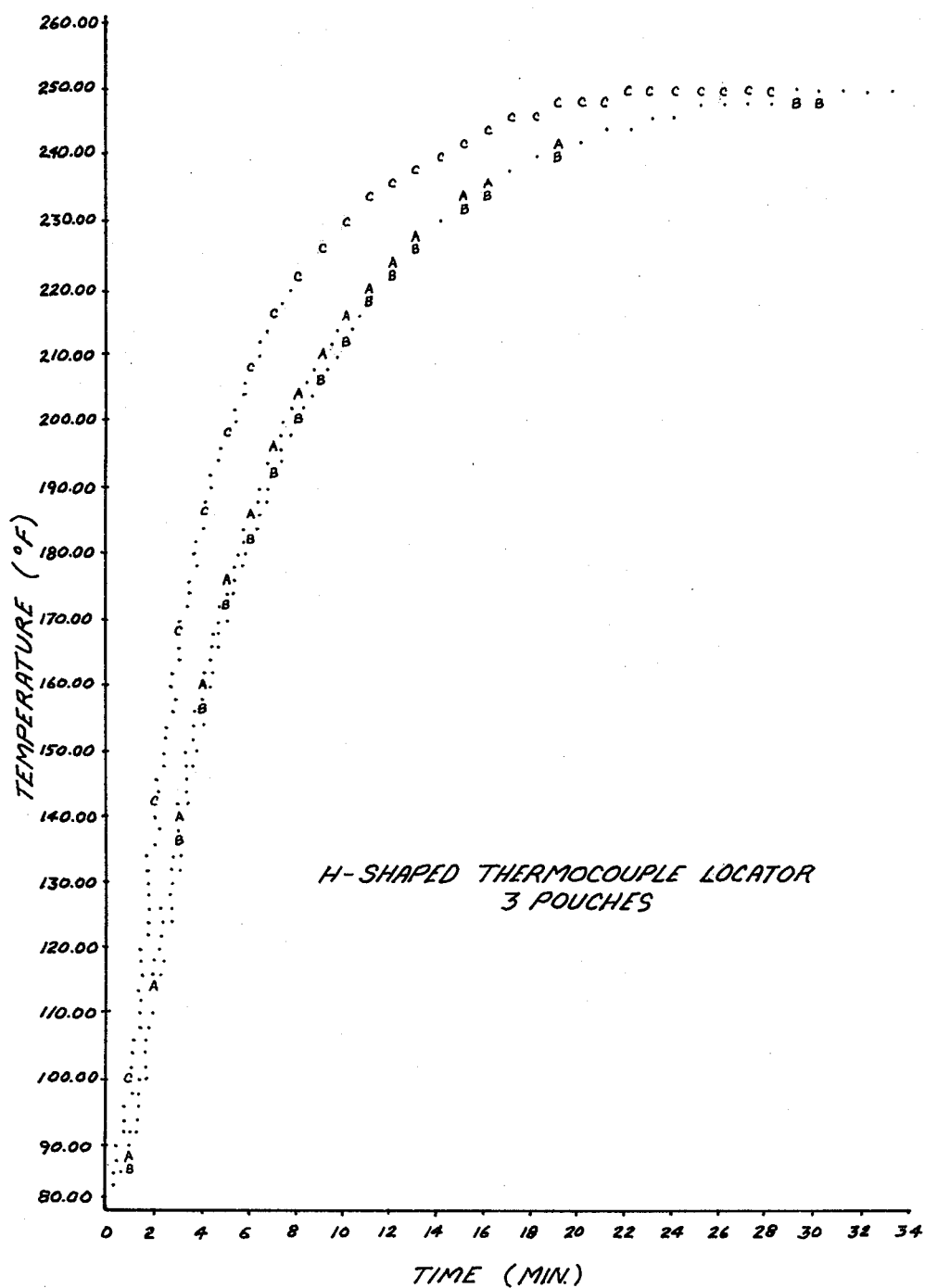

FIGS. 6A and 6B show the results of tests conducted using an H-shaped thermocouple locator like that shown in FIG. 1 and a thermocouple locator secured directly to the pouch walls used as a control.

FIG. 5 shows the control thermocouple locator which was made by Stock American, Inc., 5215 North Ironwood Rd., Milwaukee, Wis. 53217. Stock presented the control of holding a thermocouple in a flexible pouch before the development of the rigid frame thermocouple locator described herein. The control locator 100 comprises a plastic rod 102 with pointed threaded studs 104 at each end. The studs 104 puncture the pouch walls and are secured by nuts 106 which press washers 108 against the pouch walls to seal the holes made by the studs 104 in the pouch walls. The rod 102 has a hole through which the thermocouple lead wire W extends. A thermocouple TC is thus located at the geometric center of the pouch.

Four pouches were prepared by securing a control locator to each pouch above its center before filling. A thermocouple was threaded through the hole 110 until it was located at the geometric center of the pouch. Considering difficulty was encountered in manipulating the control locator inside the pouch and precise location took some time.

After the thermocouple was properly located, the pouches were filled with a 5% solution by weight in water of Sta-O-paque, a retort-stable starch sold by Staley's, Inc. The pouches were sealed under vacuum in a Swiss-Vac machine sold by Transvac Machinen Ag.

Three pouches were prepared with an H-shaped rigid frame used to locate thermocouples at the centers of the pouches. The lead wire was taped to the frame rather than passing it through a hole like the hole 22 shown in FIG. 1. These pouches were then filled with an identical starch solution and sealed in the same Swiss-Vac machine at the same time.

FIGS. 6A and 6B show the results of the temperatures recorded by the thermocouples during simultaneous thermal processing of the seven pouches. The H-shaped frame almost complete agreement with the control locator in two or three cases. The curve labelled C in FIG. 6B showed that one of the thermocouples secured to an H-shaped frame recorded a higher temperature at any given time. When the pouches were opened after the test, it was found that the thermocouple had turned about the cross-bar and was closer to one pouch wall than the other, thus illustrating the importance of the hole 22 in properly positioning the thermocouple.

FIGS. 7A and 7B show the results of heat penetration tests on ten pouches filled as described in connection with FIG. 4 using thermocouple locators like that shown in FIG. 1. All ten pouches were processed simultaneously and the time-temperature records of all ten thermocouples are virtually identical, illustrating the reliability of the thermocouple locator of the present invention.

Although several preferred embodiments of the present invention have been disclosed, one skilled in the art will recognize that modifications and alterations may be made without departing from the spirit of the invention, which is defined by the following claims.

What is claimed is:

1. In a device for measuring temperature within a flexible retortable pouch having two side seals, a top seal, and a bottom seal and being filled with a food product, said device comprising said flexible retortable pouch, a thermocouple contained within said pouch, means for locating and holding said thermocouple at the geometric center of said pouch, a cable for connecting said thermocouple to temperature recording means, and means adapted to communicate said cable through a wall of said pouch without fluid leakage, the improvement wherein said thermocouple locating means comprises:

a rigid frame contained within the pouch and substantially in the form of the letter "H", having,
  (a) two elongated side members;
  (b) a cross-bar member extending between said side members and being rigidly mounted at points spaced from the point equidistant from the ends of each of said side members, said rigid frame including said two side members and said cross-bar member being of sufficient dimensions relative to said pouch sufficient to cause the rigid frame to fit snugly in said flexible pouch to positively locate the frame and prevent movement of it relative to the pouch; and,
  (c) means for securing said thermocouple to said rigid frame, such that said thermocouple is fixedly positioned at the geometric center of said flexible pouch.

2. The improvement of claim 1, wherein said thermocouple locating means further comprises spacer means directed outward from the plane of said rigid frame and secured to said rigid frame for holding the walls of said flexible pouch at least at a predetermined distance from said thermocouple.

* * * * *